United States Patent

Gupta et al.

[11] Patent Number: 5,793,465
[45] Date of Patent: Aug. 11, 1998

[54] TORIC SURFACECASTING

[75] Inventors: Amitava Gupta, Bethesda, Md.; Ronald D. Blum, Roanoke, Va.

[73] Assignee: Innotech, Inc., Roanoke, Va.

[21] Appl. No.: 728,249

[22] Filed: Oct. 8, 1996

[51] Int. Cl.[6] .................... G02C 7/02; G02C 7/04
[52] U.S. Cl. ........................... 351/161; 351/176
[58] Field of Search ............ 351/159, 16, 168–172, 351/176, 177; 264/1.7–1.8, 1.36–1.38

[56] References Cited

U.S. PATENT DOCUMENTS

| | | | |
|---|---|---|---|
| 4,190,621 | 2/1980 | Greshes | 264/1.8 |
| 4,474,355 | 10/1984 | Greshes . | |
| 4,645,317 | 2/1987 | Frieder et al. | 351/164 |
| 4,873,029 | 10/1989 | Blum | 351/162 |
| 4,892,403 | 1/1990 | Merle | 351/159 |
| 5,020,898 | 6/1991 | Townsley | 351/161 |
| 5,028,358 | 7/1991 | Blum | 264/1.4 |
| 5,125,729 | 6/1992 | Mercure | 351/161 |
| 5,147,585 | 9/1992 | Blum | 264/1.4 |
| 5,178,800 | 1/1993 | Blum | 264/1.4 |
| 5,219,497 | 6/1993 | Blum | 264/1.4 |
| 5,288,221 | 2/1994 | Stoerr et al. | 425/125 |
| 5,316,702 | 5/1994 | Blum et al. | 264/137 |
| 5,358,672 | 10/1994 | Blum | 264/1.38 |
| 5,415,816 | 5/1995 | Buazza et al. | 264/1.38 |
| 5,455,641 | 10/1995 | Hahne et al. | 351/161 |
| 5,470,892 | 11/1995 | Gupta et al. | 264/1.38 |
| 5,480,600 | 1/1996 | Gupta et al. | 264/1.7 |
| 5,512,371 | 4/1996 | Gupta et al. | 264/1.7 |
| 5,531,940 | 7/1996 | Gupta et al. | 351/163 |
| 5,650,837 | 7/1997 | Roffman et al. | 351/161 |

FOREIGN PATENT DOCUMENTS

A80556/87  6/1988  Australia .
WO93/21010 10/1993 WIPO .

*Primary Examiner*—Frank G. Font
*Assistant Examiner*—Jason D. Vierra-Eisenberg

[57] ABSTRACT

An optical preform has a predetermined spherical curve on a concave surface of the optical preform, a predetermined spherical curve on a convex surface of the optical preform and a near add power. A thin resin is applied to the concave surface of the optical preform and molded to form a toric layer by a mold having a toric, convex mold surface. The resin layer is then cured and the mold removed to form a finished ophthalmic lens.

21 Claims, 3 Drawing Sheets

TORIC SURFACECASTING

FIELD OF THE INVENTION

The present invention relates to ophthalmic lenses, and more particularly to a method of forming a toric layer on the concave side of a preform.

BACKGROUND OF THE INVENTION

The manufacturing methods and distribution channels related to the manufacture of eyeglass lenses have not changed dramatically over the last 150 years. While there have been recent attempts to introduce more efficient methods of manufacturing eye glass lenses such as laminated wafer, front side convex SurfaceCasting and fast cure whole lens casting technology, for the most part the traditional manufacturing methods have not changed. Lens manufacturers continue casting semi-finished blanks made of homogenous materials, which are then sold to lens surfacing laboratories who customize the needed prescription by grinding and polishing these semi-finished blanks into is optical lenses. The optical lenses are then sold to the retail optical dispenser who resell them to consumers.

This manufacturing method and the channels of distribution to support this traditional method are well established throughout the world. However, this method limits technological possibilities in terms of lens types and lens materials. Furthermore, the surfacing and polishing equipment, space requirements and skilled labor needed to customize the semi-finished blanks are very expensive. Also, for the end customer who purchases and wears the eye glasses, the multi-layered distribution channel approach is inefficient and costly.

As stated above, there have been a number of attempts to bring technological advances into the optical industry in an effort to streamline manufacturing methods and distribution channels. With each new approach there is an attempt to balance ease of use, system entry price, finished lens cost, system size, optical quality and consumer demands. For example, laminating wafer technology is very user friendly and has a low entry equipment price, but produces lenses that are thicker than lenses produced using traditional manufacturing methods. Modified surfacing technology is simply an extension of the traditional manufacturing methods and requires grinding and polishing a partially pre-surfaced semi-finished blank.

Fast cure whole lens casting cuts out many steps in the traditional process of surfacing and polishing by quickly curing the entire thickness of the finished lens with UV radiation and forming it into the final prescription needed. However, in order to accomplish this, hundreds of molds and gaskets are needed for each material having a different index of refraction. Thus, this approach is neither user friendly nor easily affordable. The required molds are expensive and represent the largest portion of the capital expense making up the selling price of the system. Currently, these systems sell for about $30,000 to $40,000.

One successful manufacturing method uses a front concave multifocal mold and casts a photocurable resin layer onto the convex surface of a plastic optical preform which has the patient's distance prescription. This approach significantly reduces the number of molds needed from that of the fast cure whole lens casting process and eliminates the need for gaskets. The result is a system that is far less expensive to purchase because the number of required molds is significantly reduced and no gaskets are required. However, even with this approach, in order to cover a range of prescription from +5.50D to −6.00D, up to −2.00D cylinder, and up to +3.00D add power molds are required. These systems usually sell for about $15,000 to $20,000 because of the material costs associated with the number of expensive molds.

In the commercial setting, SurfaceCasting has only been commercialized using a front convex layer approach because, without the knowledge of the invention of fabricating predetermined spherical curves on the concave surface of the preform while specifically varying the front convex curve of the preform, the number of possible sphero toric and spherical molds needed to SurfaceCast the back concave surface of the preform could increase the material costs to such an extent that the commercial viability of the process would be questionable. And furthermore, the user friendliness of such a system would be compromised. Also, any effort to reduce the large number of molds needed could result in a significant mismatch of surface curvatures, thus necessitating the use of large numbers of different gaskets. For example, Stoerr (U.S. Pat. No. 5,288,221) (hereinafter "Stoerr") disclosed the use of gaskets and equipment to cast on the back concave surface rather than using the numerous molds which would typically be required without knowledge of the invention described herein. Stoerr utilized a piece of equipment that separated and aligned the preform and the mold to solve the commercial limiting factor caused by the number of molds needed. Although feasible, the method disclosed by Stoerr adds another level of expense and complexity by way of the equipment needed and reduces the user friendliness of the process.

In view of the above, it would be desirable to provide an alternative manufacturing method that would minimize the number of molds needed. This would reduce the entry capital costs while maintaining the optical quality of the final product, produce high yields and provide a user friendly system.

SUMMARY OF THE INVENTION

A lens product according to the present invention includes an optical preform having a distance spherical power and a near add power. A toric layer is attached to the concave surface of the optical preform. The lens product is made by providing an optical preform having a concave back surface of a predesigned specific spherical curvature to produce a distance spherical power. In addition, the optical preform has a near add power. A photocurable resin is then cast on the concave surface of the optical preform and molded and shaped to form a toric layer, thereby providing the astigmatic correction for a given prescription. The resin is then cured to form a finished lens product. In an alternate embodiment of the invention, both a toric and at least a part of a spherical distance power are added to the concave surface of the preform.

By casting only the toric layer for the correction of astigmatism onto the concave surface of an optical preform which contains the appropriate distance spherical power, the required number of molds can be reduced significantly. Furthermore, since the back toric molds are relatively inexpensive when compared to the front multifocal molds typically used with systems which cast a resin layer on the front convex surface of a preformed optic, additional cost reductions can be realized. In current commercial systems that use front convex casting which cast power ranges of spheres of +5.50D to −6.00D, cylinder up to −2.00D and add powers up to a +3.00D, all in 0.25D steps, 72 front multifocal molds are needed for each multifocal design to cover 4 base curves.

Therefore, a total of 144 molds would be needed for 2 designs such as a flat top bifocal and a progressive addition lens. A third multifocal design would increase this total by an additional 72 molds. In contrast, since the present invention uses an optical preform with predetermined specific spherical concave curves, the number of molds can be reduced from 144 to as few as 36, and the use of additional multifocal designs does not increase the number of required molds. Furthermore, the cost to produce a toric mold is significantly less than the cost to produce a front progressive addition mold.

DETAILED DESCRIPTION OF THE INVENTION

Currently, SurfaceCasting has been commercialized by way of casting the front convex surface onto the convex spherical surface of a spherical or sphero toric preform. Blum (U.S. Pat. No. 5,178,800), Blum (U.S. Pat. No. 5,147,585), Blum (U.S. Pat. No. 5,219,497), Gupta (U.S. Pat. No. 5,470,892), Blum (U.S. Pat. No. 5,358,672), Blum (U.S. Pat. No. 5,316,702), Gupta (U.S. Pat. No. 5,480,600), Gupta (U.S. Pat. No. 5,531,940), Greshes (U.S. Pat. No. 4,190,621), and Greshes (U.S. Pat. No. 4,474,355), describe and teach this process in detail, and are incorporated herein by reference.

Figure 1:
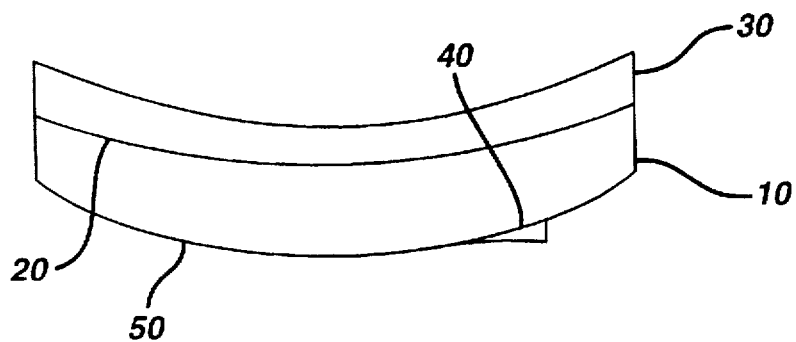
FIG. 1 is a cross section of preform having an added toric layer according to a preferred embodiment of the present invention.
Figure 2:
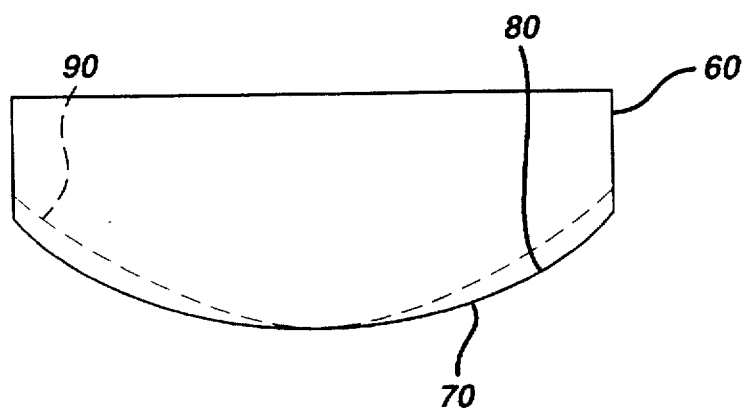
FIG. 2 is a cross section of a toric mold.
Figure 3:
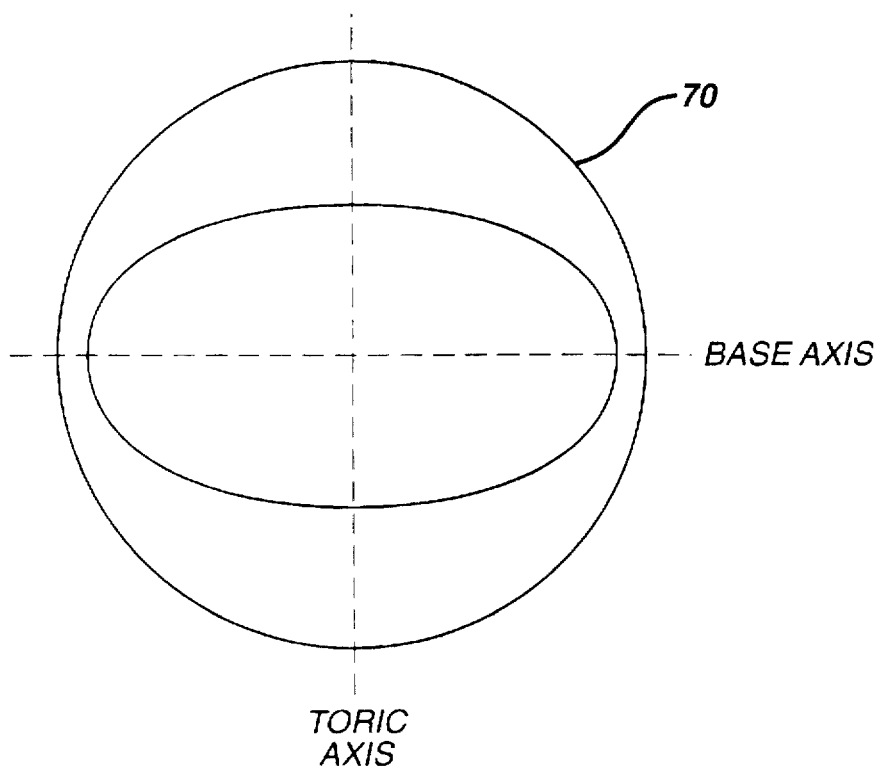
FIG. 3 is a view of the toric surface of a toric mold.

As shown in FIG. 1, a preform 10 has a predesigned concave spherical curve 20, and the toric layer 30 is cast onto the predesigned concave spherical curve 20 of the preform 10. In addition, the preform 10 has a predesigned convex spherical curve 40 on the front convex surface 50 of the preform 10. As shown in FIGS. 2 and 3, the toric curve of the toric layer 30 is formed by a toric mold 60. This approach minimizes not only the number of required molds but also minimizes mismatch of the mold toric surface 70 with the concave surface of the preform 10 at the appropriate axis orientation to correct for astigmatism. For example, using the method of the present invention, the base curve 80 of the toric mold 60 is designed so the base curve 80 aligns within about ±0.12 diopter of the concave spherical curve 20 of the preform 10. The toric surface 90 of the toric mold 60 is mismatched by the appropriate amount to create the desired toric power. During molding, a gasket or sealing ring may be used. However, the use of a gasket or sealing ring may be unnecessary if capillary attraction prevents the resin from significantly escaping the region bounded by the toric mold 60 and the spherical preform surface 20.

In a preferred embodiment, one to five different specific concave spherical surfaces 20 are formed on preforms 10, with curvatures that are within ±0.12D of the base curve 80 of the toric mold 60. The preforms 10 have numerous predetermined front convex base curves 40 which, when combined with the one to five back concave spherical curves 20, create all needed spherical powers. In this preferred embodiment, the front convex surface 40 of the preform 10 varies 48 times, allowing for 48 different spherical distance powers of +5.50D to –6.00D. And, the convex surface 40 of the preform 10 will continue to vary every 0.25D for distance spherical powers over +5.50D or over –6.00D.

In other embodiments, over five specific concave spherical curves 20 are utilized. The number of variations of the front convex curve 40 of the preform 10 is reduced by providing different concave spherical curves 20 of the preform 10; thus, allowing for fewer front preform convex curves 40.

Therefore, the invention will make it possible to commercialize casting the rear concave surface of a preform easily and economically. Casting the rear concave surface of a preform has significant direct and indirect benefits compared to the current commercial front convex casting process. These benefits not only include a lower entry price, but also enhanced ease of use, and the ability of fabricating branded product. For example, using the method of the present invention, it is possible to fabricate the preforms out of branded semi-finished lens blanks made by leading lens manufacturers.

Figure 4:
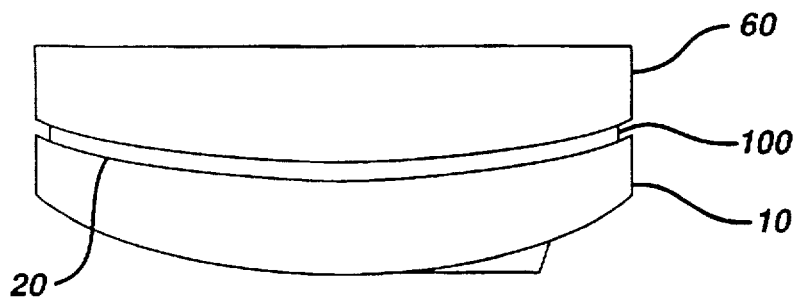
FIG. 4 is a cross section of an preform, resin and toric mold assembly.
Figure 5:
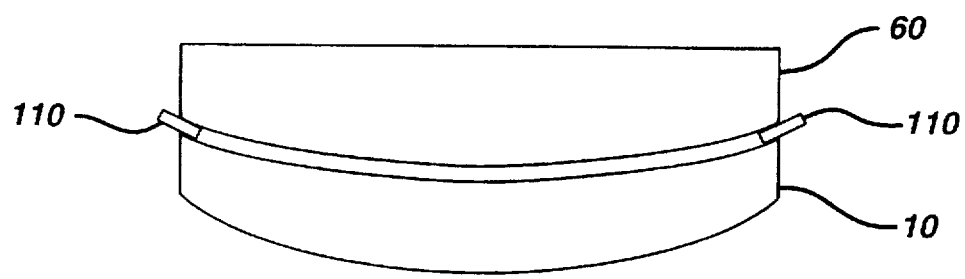
FIG. 5 is a cross section of a preform and toric mold assembly.

As shown in FIG. 4, when forming a lens, the weight of the mold 60 is floated on a thin layer of resin 100 that is cast on the concave surface 20 of the preform 10. In the alternate embodiment illustrated in FIG. 5, a thin piece of tape 110 having a thickness of about 0.1–0.5 mm is placed on each of two edges of the mold 60 or preform 10 between the preform and the mold surface interface, thus creating separation between the preform 10 and the mold 60 in order to allow for the minimal thickness to be added on the non toric component. When using this approach, the tape 110 is placed at the interface between the toric mold 60 and the preform 10 which conforms to the spherical concave curve 20 of the preform 10. The viscosity and density of the resin is adjusted so that the angular orientation of the toric axis of the mold with respect to the axis of the preform, delineated by the tapes, is maintained without further support. In all cases, the viscosity and density of the resin are such that an adequate amount of resin is maintained between the preform and the mold. In other embodiments, an aligning ring is utilized to maintain proper decentration as well as the proper alignment of the interface between the toric mold and the concave surface of the preform. In other further embodiments, the thickness of the resin layer is maintained by a gasket-like housing which separates the mold and the preform by an appropriate amount. However, it is possible to mold the resin layer without the use of a gasket. Also, in addition to casting a resin on the concave surface of the preform, the toric layer may be added as a partially polymerized layer which is initially attached to either the mold surface or the concave surface of the preform.

The toric mold can have a smaller or larger diameter than the diameter of the preform, or can be the same size as the preform.

It is also possible to decenter the preform 10 with respect to the mold 60 in order to allow for greater effective use of the lens blank without incurring an unacceptable amount of prism. When performing this step, it is only necessary to move the mold 60 on the resin 100 in such a way that the mold 60 and the preform 10 maintain their natural horizontal alignment of curves, while limiting or minimizing any significant change in this alignment with respect to thickness on one side or the other, thus avoiding unwanted prism. This approach will allow for a single, centered, front multifocal style to be used to produce a right or left lens, while simply moving the toric mold 60 horizontally to the right or left by the appropriate amount needed for the near point decentration of the multifocal zone.

Therefore, it is possible to use the method of the present invention to cast the toric curves on the concave surface of the preform 10, and thereby correct the appropriate amount of astigmatism at the proper axis orientation for the patient's prescription needs. This can be done for single vision as well as multifocal lenses. Furthermore, it is possible to decenter the toric mold 60 with respect to a centered multifocal zone on the preform 10 to achieve proper multifocal decentration. Finally, once the toric mold 60 is properly aligned with respect to the preform 10 for astigmatic axis orientation, astigmatic power correction, and near point multifocal decentration, the assembly containing the mold 60, resin 100 and preform 10 is cured by any appropriate means which will cure the resin layer 100 and bond the newly cured plastic toric layer 30 to the preform 10.

The following example illustrates the method of the present invention and various embodiments thereof.

EXAMPLE

A spherical, multifocal preform 10, having a distance spherical power of +2.00D and a near add power of +2.00D, is mounted concave side up in a tray equipped with a protractor. Liquid polymerizable resin 100 is deposited on to the concave surface 20 of the lens preform 10. Two pieces of flexible, metallized tape 110 (of thickness approximately 0.15 mm) are placed at opposite ends of a diameter of the toric mold 60 to be used, each piece of tape 110 protruding about 1.00 mm on to the mold casting surface. The mold 60 has a toric surface 90 on the convex side, a base curvature of 4.00D and a toric curvature of 2.00D. The mold 60, with the two pieces of tape 110 attached, is placed convex surface down into the resin deposit 100, allowing the resin to spread out and fill the space between the mold 60 and the lens preform 10. The toric axis is set to 35 degrees with the help of the protractor. The mold assembly is placed in the photocuring oven, and subjected to both visible as well as ultraviolet radiation in the wavelength range of about 330–500 nm and a simultaneous temperature ramp which starts at about 100° F. and ends at about 200° F. over a period of approximately 16 minutes. The lens is demolded, and annealed by immersing it in water at about 200° F. for approximately 2 minutes. The power of the lens, as read on a lensometer at the optical center, was OS +1.95D, −2.05D ×35, Add 1.95D.

What is claimed is:

1. An optical preform for an astigmatic multifocal lens, wherein the optical preform includes a predetermined distance spherical prescription and a multifocal section, and wherein a concave side of the optical preform has a nontoric curve.

2. The optical preform of claim 1, wherein the concave side of the optical preform has a spherical curve.

3. An optical preform for an astigmatic lens, wherein the optical preform has a nontoric convex surface and a nontoric concave surface, and wherein the optical preform includes a predetermined distance spherical prescription.

4. The optical preform of claim 3 wherein the optical preform is for an astigmatic eyeglass lens.

5. An optical preform for an astigmatic multifocal lens, wherein the optical preform has a nontoric convex surface and a nontoric concave surface, and wherein the optical preform includes a predetermined distance spherical prescription.

6. The optical preform of claim 5, wherein the predetermined distance spherical prescription of the optical preform is within about ±0.12D of a desired distance spherical lens prescription.

7. The optical preform of claim 5 wherein the optical preform is for an astigmatic multifocal eyeglass lens.

8. An astigmatic multifocal lens, comprising:

an optical preform having a predetermined distance spherical prescription and a multifocal section, wherein a concave side of the optical preform has a nontoric curve; and a polymerized resin layer directly bonded to the concave surface of the optical preform to form a toric layer.

9. The astigmatic multifocal lens of claim 8, wherein the concave side of the optical preform has a spherical curve.

10. The astigmatic multifocal lens of claim 8 wherein the lens is an astigmatic multifocal eyeglass lens.

11. An astigmatic multifocal lens, comprising:

an optical preform having a multifocal section, wherein the optical preform has a predetermined distance spherical prescription component, and a polymerized resin layer directly bonded to a concave surface of the optical preform, wherein the resin layer is toric and provides a predetermined astigmatic prescription component.

12. The astigmatic multifocal lens of claim 11, wherein the distance spherical prescription component of the optical preform is within about ±0.12D of a desired distance spherical lens prescription.

13. The astigmatic multifocal lens of claim 11 wherein the lens is an astigmatic multifocal eyeglass lens.

14. A method of making an astigmatic multifocal lens, comprising the steps of:

providing a preform having a predetermined distance spherical prescription and a multifocal section, wherein a concave side of the optical preform has a nontoric curve;

applying a resin layer on the concave surface of the optical preform to form a toric layer; and curing the resin to form an astigmatic multifocal lens.

15. The method of claim 14, wherein the concave side of the optical preform has a spherical curve.

16. The method of claim 15, wherein the resin is photocurable.

17. The method of claim 15, further comprising the step of molding the resin layer with a toric mold having a base curve which aligns within about ±0.12D with the concave curve of the preform.

18. The method of claim 17, further comprising the step of decentering the optical preform with respect to the toric mold while maintaining a horizontal alignment of the curves of the optical preform and the toric mold.

19. The method of claim 17, wherein the resin is cured by subjecting the optical preform, resin layer and toric mold to visible and ultraviolet radiation.

20. A method of making an astigmatic multifocal lens, comprising the steps of:

providing an optical preform having a multifocal section, wherein the optical preform has a predetermined distance spherical prescription component;

applying a resin layer to a concave surface of the optical preform to form a toric layer; and curing the resin layer to form an astigmatic multifocal lens, wherein the cured resin layer provides an astigmatic prescription component.

21. The method of claim 20, wherein the distance spherical prescription component of the optical preform is within about ±0.12D of a desired distance spherical lens prescription.

* * * * *